United States Patent Office 3,288,487
Patented Nov. 29, 1966

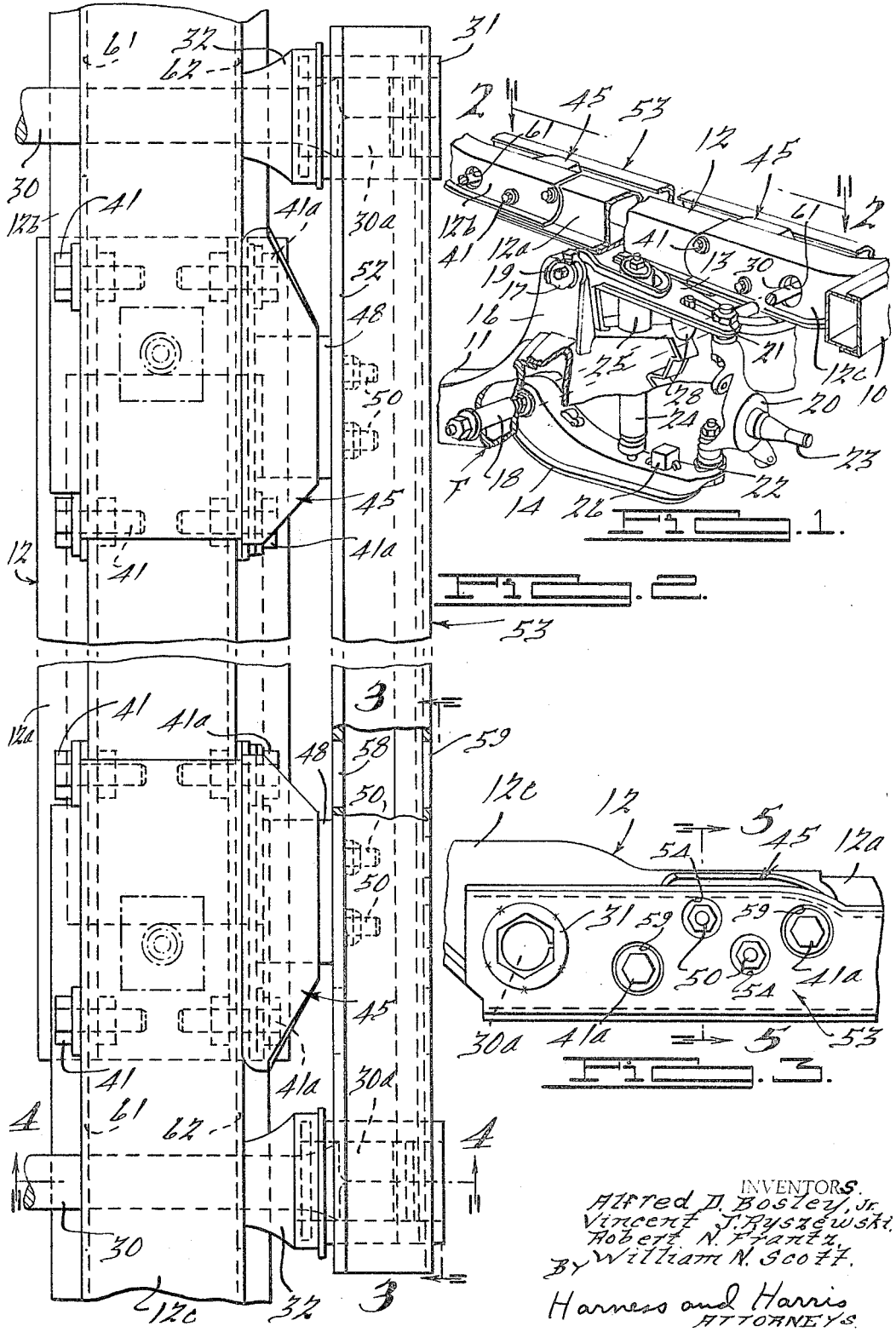

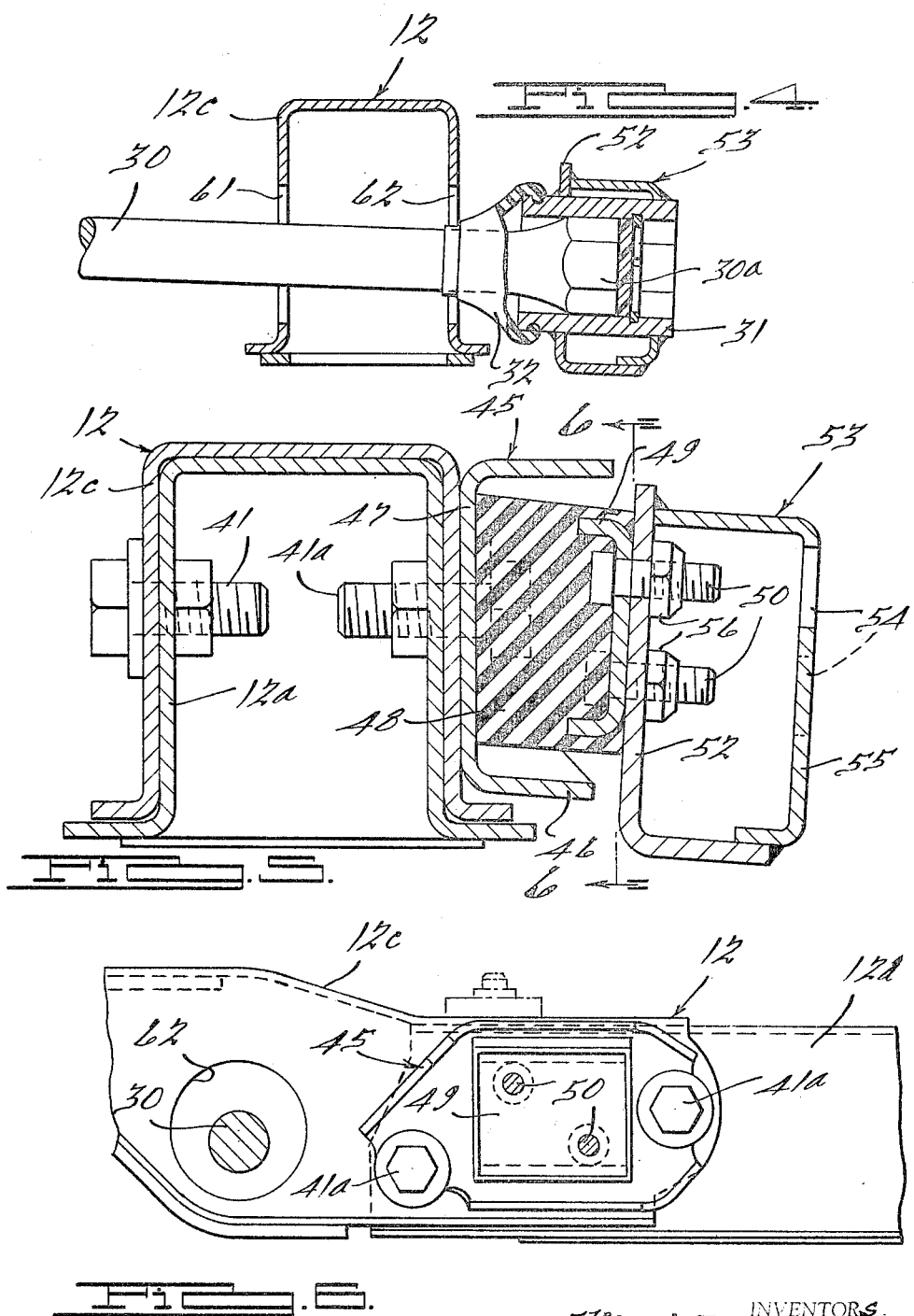

3,288,487
TORSION BAR WHEEL SUSPENSION
Alfred D. Bosley, Jr., and Robert N. Frantz, Birmingham, Vincent J. Ryszewski, Detroit, and William N. Scott, Royal Oak, Mich., assignors to Chrysler Corporation, Highland Park, Mich., a corporation of Delaware
Filed July 28, 1964, Ser. No. 385,699
4 Claims. (Cl. 280—124)

This invention relates to a torsion bar wheel suspension and particularly to the manner of resiliently mounting a torsion bar on a vehicle chassis or body having independently sprung wheels.

It is a primary object of this invention to provide an improved manner of resiliently connecting the anchored end of a torsion bar to a body or chassis supported anchor member such that road vibrations and noise will be isolated from the vehicle body or chassis member that provides the anchorage for the torsion bar.

It is another object of this invention to provide a torsion bar wheel suspension wherein the torsion bar can be placed at the lowest possible level that will still give the required road clearance and still not interfere with any other portions of the vehicle body or chassis or with the preferred chassis geometry.

It is still another object of this invention to provide a detachable, noise insulated connection between a torsion bar and the vehicle body or chassis member connected to the anchored end of the torsion bar whereby the body and/or chassis is isolated from road noise and the torsion bar assembly may be readily installed and removed by virtue of the arrangement of the noise insulating mounting.

It is still another object of this invention to disclose a resiliently mounted anchorage for a vehicle wheel suspension torsion bar that will reduce suspension harshness and give a quieter ride as a result of noise isolation resulting from the resilient mounting of the torsion bar.

This invention is an improvement over certain inventions disclosed in the related U.S. patents of John E. Collier et al. and Maurice D. Karlstad, Jr., Patents Nos. 2,972,489 and 3,027,177, respectively.

Other objects and advantages of this invention will become readily apparent from a consideration of the following description and the related drawings wherein:

FIGURE 1 is a fragmentary perspective view of a portion of a motor vehicle body or chassis frame having a torsion bar sprung wheel assembly embodying this invention;

FIGURE 2 is an enlarged, fragmentary, top plan view of those portions of the assembly shown in FIGURE 1, viewed along the line and in the direction of the arrows 2—2 of FIGURE 1, certain portions of the FIGURE 1 assembly having been broken away for the sake of clarity;

FIGURE 3 is an enlarged, fragmentary side elevational view taken along the line 3—3 of FIGURE 2;

FIGURE 4 is an enlarged fragmentary, sectional elevational view taken along the line 4—4 of FIGURE 2;

FIGURE 5 is an enlarged, fragmentary, sectional elevational view of the connection between the support for the anchored end of the torsion bar and the associated frame member shown in FIGURE 1, and FIGURE 6 is an enlarged, fragmentary sectional elevational view taken along the line of and in the direction of the arrows 6—6 of FIGURE 5.

FIGURE 1 of the drawings shows a portion of a motor vehicle wheel supporting frame F that can be either understructure of a unitized body or a separate chassis frame. Frame F includes a longitudinally extending side rail 10 and a pair of transversely extending, longitudinally spaced, cross rails 11 and 12 respectively. Rear cross member 12 provides the support for a rear engine mount (not shown). Extending outwardly from the transversely of the side rail 10 and pivotally connected to frame F for swinging movement about longitudinally extending pivot axes are upper and lower wheel supporting control arms 13 and 14 respectively. Upper control arm 13, which is substantially V-shaped in plan, is mounted on the frame side rail 10 by means of upstanding brackets 16 that support pivot pins 19 which include caster and camber adjustment means 17. Adjustment means 17 form no part of this invention. The disclosed adjustment means 17 is described in detail in the U.S. patent of Robert H. Kushler, 2,954,998 dated October 4, 1960. The lower control arm 14 is pivotally mounted on the cantilever-type pivot shaft 18 that is supported by the frame cross rail 11. This pivot shaft 18 and its associated torsion bar connecting means is described in detail in Patent 3,027,177 and this structure forms no part of this invention.

Control arms 13 and 14 have a wheel supporting knuckle 20 pivotally connected thereto by means of upper and lower ball joint connections 21 and 22 respectively. Knuckle 20 mounts a spindle 23 that is adapted to rotatably support a wheel (not shown). A shock absorber unit 24 is connected between the lower control arm 14 and a housing 25 seated on the frame side rail 10. Pivotal movement of the control arms 13, 14 is limited by engagement of the resilient bumpers 28, 26.

To provide for springing of the wheel supporting control arms 13, 14 the disclosed structure utilizes a torsion bar spring 30. Spring 30 has a hexagonally shaped rear end portion 30a (see FIGURE 3) that is non-rotatably seated in the hexagonal socket in the cup-like sleeve 31 that is fixedly connected to the frame cross rail 12 by the insulating means to be described hereinafter. A boot 32 can be seated around the torsion bar 30 at the open end of the sleeve 31 to prevent the entrance of foreign matter into the front end of the socket connection.

From FIGURE 1 it will be noted that the lower control arm 14 is rotatably mounted on the pivot pin journal 18. Details of this mounting are shown in Patent 3,027,177 and form no part of this invention. The rear end portion of the pin 18 is provided with a hexagonal socket formation (not shown) to matingly receive the hexagonally formed front end portion of the torsion bar spring 30. A resilient boot (not shown), similar to the boot 32 used at the rear end of torsion bar 30, can also be used on the front end of the bar 30 to prevent the entrance of foreign matter into the non-rotatable connection of the front end of bar 30 to the sleeve portion on the rear of pin 18. With the torsion bar mounting heretofore described, it is thought to be apparent that the torsion bar 30 is coaxial with the lower control arm pivot axis 18. The rearwardly and horizontally extending torsion bar 30 provides a definite advantage in that it permits the vehicle floor above the torsion bar to be lowered the maximum amount. The connection of the rear end of the torsion bar 30 to the rear cross rail 12, in the manner to be described, permits the torsion bar anchor to be located at the lowest possible level and to be insulated against noise transmissions to the chassis frame and/or associated vehicle body.

Looking now at FIGURES 2–6 that relate to the noise insulated anchor means for the rear end of the torsion bars 30, it will be seen that there is no direct metal-to-metal contact between the rear end of the torsion bars 30 and the frame member 12 that provides the anchorage for the torsion bars. The frame member or rail 12 is a bolted together three-piece assembly composed of the box-like center section 12a and the pair of inverted channel-shaped end sections 12b and 12c. Bolt and nut assemblies 41 and 41a detachably connect the rail center section 12a to the rail end sections 12b and 12c. Bolt and nut assemblies 41a not only interconnect the frame sections 12a, 12b and 12c but in addition the rearwardly positioned assemblies 41a also mount a pair of spaced noise insulating mounts 45 on the rear side of the rail 12.

Noise insulating mounts 45 (see FIGURE 5) each comprise a channel-shaped mounting bracket 46 that has a pair of bores in the web portion 47 thereof to receive the threaded shanks of the bolt members 41a. Bonded to the web portion 47 is a block of rubber-like material 48 that provides a resilient noise insulating link in the mount 45. Also countersunk in and bonded to the rear face of the insulator block 48 is a channel-shaped bolt supporting bracket or plate 49. Plate 49 carries the pair of spaced bolts 50. These bolts 50 have their shank portion extending through and nut connected to the front wall 52 of the box-like anchor bar 53. Anchor bar 53 has holes 54 in the rear wall 55 thereof so that the nuts 56 can be installed and removed from the rear side of bar 53.

The mounting bar 53 (see FIGURE 2) also has holes 58, 59 through the front and rear walls thereof that are aligned with the bolts 41a so that these bolt connectors can be readily installed and removed.

Looking next at FIGURE 4 it will be noted that the rear end portions of the torsion bars 30 extend through aligned bores 61, 62 in the cross member end sections 12b and 12c and are fixedly anchored in sleeves 31 welded or otherwise fixed in the anchor bar 53. Sleeve 31 has a hexagonal bore that matingly receives the hexagonally shaped rear end portion 30a of the associated torsion bar 30.

From the foregoing description of the manner of mounting the bar 53 on the cross rail 12 it is obvious that any vibrations or road noise transmitted from the road wheels through the torsion bars 30 will be damped by and insulated from the cross member 12 by means of the rubber-like mounting blocks 48 that connect the anchor bar 53 to the cross rail 12. Also, because of the resilient mounting of the anchor bar 53 on the cross member 12, there is a reduction in suspension harshness that is appreciated by the vehicle operator and the passengers. The disclosed suspension torsion bar anchorage provides a silencing package that provides a softer and quieter ride. As the torsion bar rear anchors 31 are no longer integral with engine rear support cross member 12, the suspension and steering vibrations developed during ordinary driving are now prevented from being telegraphed into the vehicle underbody structure through the torsion bar rear anchor attachments. This new resilient torsion bar anchorage provides means whereby the front suspension vibrations are isolated and the torsion bar spring rate is reduced. The torsion bar rear anchors 31 are now integrated into a single, body and frame mounted, cross member 53 which floats with the aid of the rubber-like isolators 45, 45 that are located just rearwardly of and detachably connected to the body or frame cross member 12. It is believed to be readily obvious that this invention is applicable to any torsion bar independent wheel suspension whether it be associated with a unitized body vehicle that does not include a separate chassis frame or in a vehicle having a body shell mounted on a separate chassis frame. In the specification and claims the term "body mounted frame member" is intended to cover a frame member, such as the member 12, whether it be a part of a unitized body or a rail of a separate chassis frame. The frame member 12 would be body mounted in either instance even though the chassis frame application is an indirect connection through the body bolts connecting the chassis frame to the body shell.

We claim:
1. In a motor vehicle having independently sprung front wheels, said vehicle having a front wheel supporting member mounted thereon for pivotal oscillation about an axis extending substantially longitudinally of the vehicle, a vehicle frame member extending transversely of the vehicle and positioned rearwardly of said front wheel supporting member, a torsion bar extending longitudinally of the vehicle having the front end portion thereof fixedly connected to said wheel supporting member for the application of torsional stress thereby, the rear end portion of said torsion bar extending rearwardly beyond said frame member, a resilient connector member fixedly mounted on said frame member having a portion thereof spaced rearwardly of said frame member and connected to the rear end portion of said torsion bar to provide a floating, but non-rotatable, independent anchorage therefor, said resilient connector comprising a pair of spaced rigid bracket pieces having a block of rubber-like insulator material sandwiched between and connected to said spaced bracket pieces, one of said bracket pieces being rigidly connected to said frame member and the other bracket piece having means rigidly connected to said rear end portion of said torsion bar.

2. In a motor vehicle having a pair of transversely spaced, independently sprung, front wheels, a front wheel supporting member mounted on each side of the front end of the vehicle for pivotal oscillation about an axis extending substantialy longitudinally of the vehicle, a vehicle frame member extending transversely of the vehicle at a position rearwardly of the wheel supporting members, a torsion bar spring extending longitudinally of the vehicle at each side thereof, each torsion bar spring having its front end fixedly connected to the wheel supporting member at that side of the vehicle with the rear end portions of each torsion bar spring extending through and beyond openings in said vehicle frame member, a road noise insulating independent anchorage for each of the torsion bar rear end portions floatingly comprising a block of resilient rubber-like material having a portion fixedly attached to said frame member and another rearwardly spaced portion fixedly attached to a transversely extending anchor bar that can float relative to said frame member, said anchor bar having a pair of transversely spaced anchor sleeve formations thereon aligned with and fixedly connected to the rearwardly projecting rear ends of said pair of torsion bar springs, said resiliently supported, floating, anchor bar providing torsion bar spring anchorages permitting limited relative shift of the torsion bar rear end portions that reduce suspension harshness and damp road noise transmitted to the torsion bars.

3. In a motor vehicle torsion bar spring suspension as set forth in claim 2 wherein said anchor bar is detachably connected to said block of rubber-like material to facilitate servicing of the torsion bar suspension.

4. In a motor vehicle torsion bar spring suspension as set forth in claim 2 wherein said anchor bar is detachably connected to said block of rubber-like material to facilitate servicing of the torsion bar suspension and said block of rubber-like material is detachably connected to said frame member.

References Cited by the Examiner
UNITED STATES PATENTS

| | | | |
|---|---|---|---|
| 2,845,279 | 7/1958 | Polhemus | 280—124 |
| 3,027,177 | 3/1962 | Karlstad | 280—124 |
| 3,178,200 | 4/1965 | Backaitis | 280—124 X |

FOREIGN PATENTS

| | | |
|---|---|---|
| 129,465 | 9/1950 | Sweden. |

BENJAMIN HERSH, *Primary Examiner.*

W. D. MARCONTELL, M. S. SALES,
*Assistant Examiners.*